United States Patent [19]
Gamble et al.

[11] Patent Number: 6,166,901
[45] Date of Patent: Dec. 26, 2000

[54] VIBRATION DAMPENING SYSTEM FOR REMOVABLE HARD DISK DRIVE CARRIERS

[75] Inventors: Eric T. Gamble, Raleigh; James R. Drake, Burlington; Joaquin F. Pacheco, Apex, all of N.C.

[73] Assignee: International Business Machines Corporation, Armonk, N.Y.

[21] Appl. No.: 09/042,037

[22] Filed: Mar. 13, 1998

[51] Int. Cl.[7] ...................................................... G06F 1/16
[52] U.S. Cl. .......................... 361/685; 248/560; 248/562; 248/630; 248/618
[58] Field of Search .................................... 361/685, 727; 369/75.1, 75.2, 76, 77.1, 77.2, 78, 79, 80, 81, 82; 312/332.1, 333; 248/683, 684, 686, 638, 618, 560, 562

[56] References Cited

U.S. PATENT DOCUMENTS

| | | | |
|---|---|---|---|
| 4,553,231 | 11/1985 | D'Alayer De Costemore D'Arc .. | 248/638 |
| 4,683,520 | 7/1987 | Grassens et al. ........................ | 361/685 |
| 4,685,303 | 8/1987 | Branc et al. ............................. | 361/685 |
| 4,705,257 | 11/1987 | Leo et al. ................................ | 248/638 |
| 4,845,589 | 7/1989 | Weidler et al. . | |
| 4,896,777 | 1/1990 | Lewis ...................................... | 361/685 |
| 4,926,291 | 5/1990 | Sarraf ...................................... | 361/685 |
| 5,004,207 | 4/1991 | Ishikawa et al. ........................ | 248/632 |
| 5,042,024 | 8/1991 | Kurosawa et al. ...................... | 369/75.1 |
| 5,315,478 | 5/1994 | Cadwell et al. . | |
| 5,332,306 | 7/1994 | Babb et al. . | |
| 5,340,340 | 8/1994 | Hasting et al. . | |
| 5,402,308 | 3/1995 | Koyannagi et al. ..................... | 361/685 |
| 5,426,562 | 6/1995 | Morehouse et al. .................... | 248/686 |
| 5,463,527 | 10/1995 | Hager et al. ............................. | 361/685 |
| 5,491,608 | 2/1996 | Koyanagi et al. ....................... | 361/685 |
| 5,510,954 | 4/1996 | Wyler ...................................... | 361/685 |
| 5,515,239 | 5/1996 | Kamerman et al. . | |
| 5,579,204 | 11/1996 | Nelson et al. . | |
| 5,652,695 | 7/1997 | Schmitt . | |
| 5,654,875 | 8/1997 | Lawson .................................. | 361/685 |

(List continued on next page.)

FOREIGN PATENT DOCUMENTS 2-137181  5/1990  Japan .................................... 361/685

OTHER PUBLICATIONS

IBM Technical Disclosure Bulletin, vol. 27, No. 4B, Sep. 1984.

*Primary Examiner*—Gregory Thompson
*Assistant Examiner*—Lisa Lea-Edmonds
*Attorney, Agent, or Firm*—Felsman, Bradley, Vaden, Gunter & Dillon

[57] ABSTRACT

A "hot-pluggable" hard disk drive is mounted in a removable hard disk drive tray. The hard disk drive tray has a vibration dampening system for reducing vibration between the hard disk drive, the hard disk drive tray, and a hard disk drive docking bay located within a computer system. The vibration dampening system has three primary components. The first component is a strip of polymeric material located between an end of the hard disk drive tray and the docking bay. The second component of the vibration dampening system is a set of polymeric strips located between an inner surface of the tray and the hard disk drive. The third component of the vibration dampening system is a set of spring assemblies. Each spring assembly is located between the sides of the tray and the docking bay.

21 Claims, 3 Drawing Sheets

6,166,901
Page 2

U.S. PATENT DOCUMENTS

| | | | |
|---|---|---|---|
| 5,666,271 | 9/1997 | Kim et al. | |
| 5,668,697 | 9/1997 | Dowdy | 361/685 |
| 5,673,171 | 9/1997 | Varghese et al. | 361/685 |
| 5,687,059 | 11/1997 | Hoppal | 361/685 |
| 5,703,734 | 12/1997 | Berberich et al. | 361/685 |
| 5,706,168 | 1/1998 | Erler et al. | 361/685 |
| 5,721,669 | 2/1998 | Becker et al. | |
| 5,734,557 | 3/1998 | McAnally et al. | |
| 5,760,998 | 6/1998 | Berberich et al. | 361/685 |
| 5,761,031 | 6/1998 | Ajmani | 361/685 |
| 5,777,845 | 7/1998 | Krum et al. | 361/685 |
| 5,784,351 | 7/1998 | Takagi | 369/75.1 |
| 5,837,934 | 11/1998 | Valavanis et al. | 361/685 |
| 5,914,855 | 6/1999 | Gustafson et al. | |
| 5,995,365 | 11/1999 | Broder et al. | 361/685 |
| 6,002,588 | 12/1999 | Vos et al. | 361/685 |
| 6,002,658 | 12/1999 | Aso et al. | 369/75.1 |
| 6,005,768 | 12/1999 | Jo | 361/685 |
| 6,011,687 | 1/2000 | Gluskoter et al. | |
| 6,021,041 | 2/2000 | Genix et al. | 361/685 |
| 6,028,766 | 2/2000 | Strickler | 361/685 |
| 6,058,016 | 5/2000 | Anderson et al. | |
| 6,067,225 | 5/2000 | Reznikov et al. | |
| 6,078,498 | 6/2000 | Eckerd et al. | 361/685 |

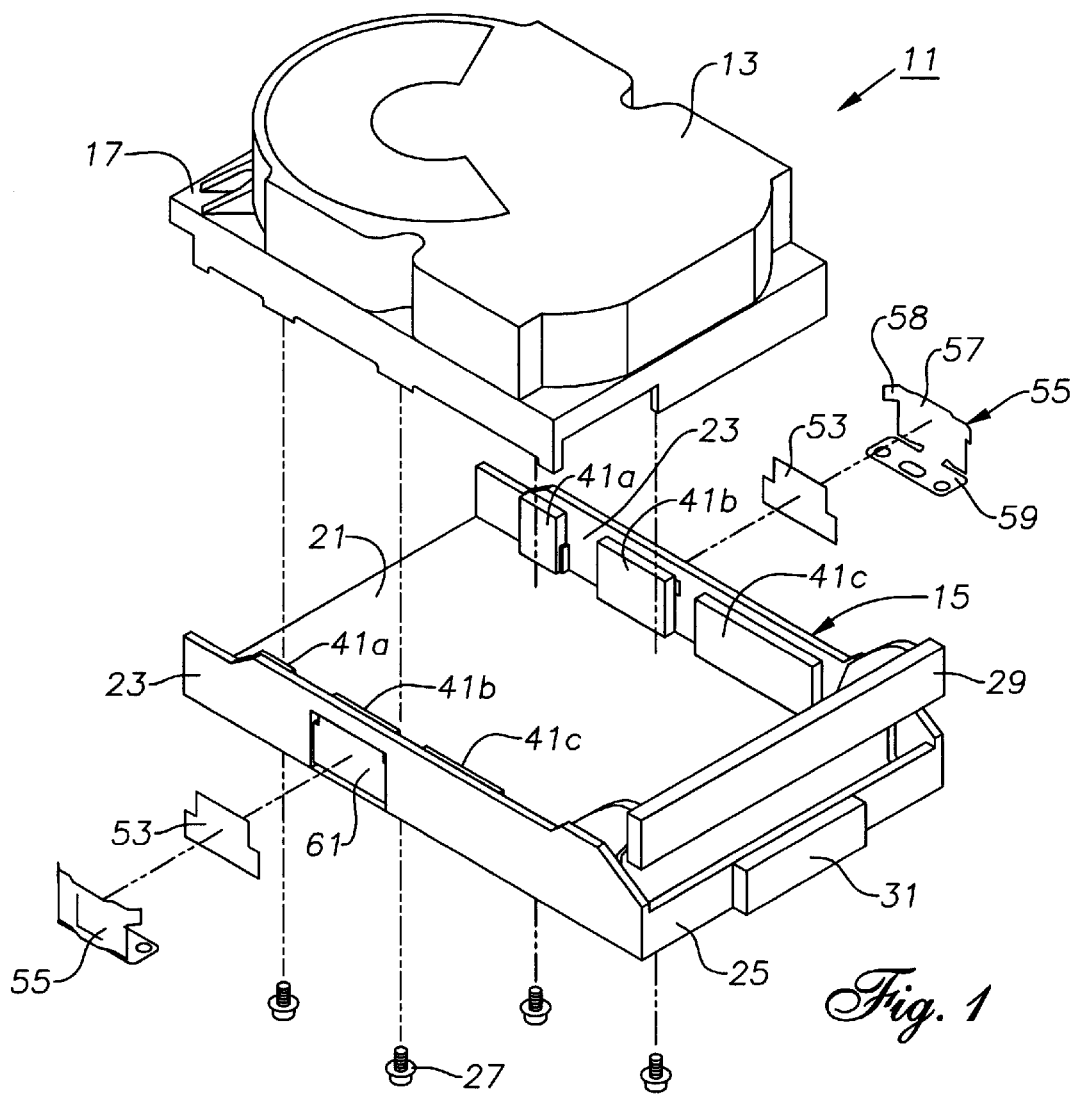
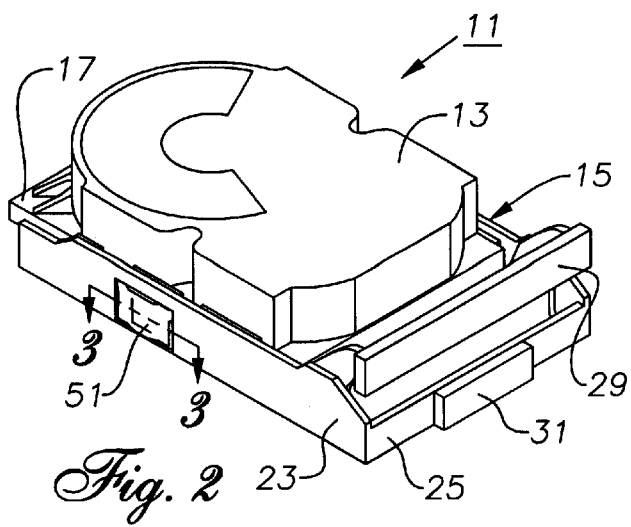

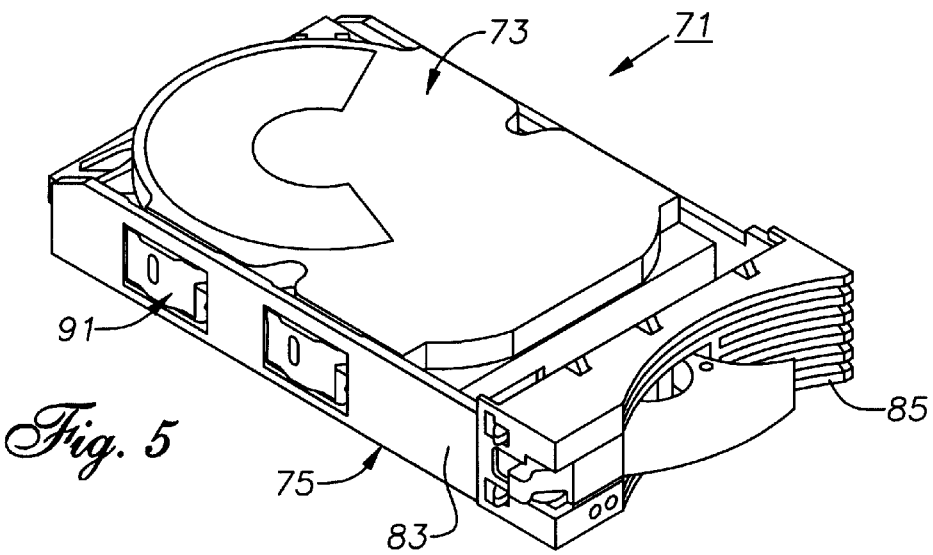
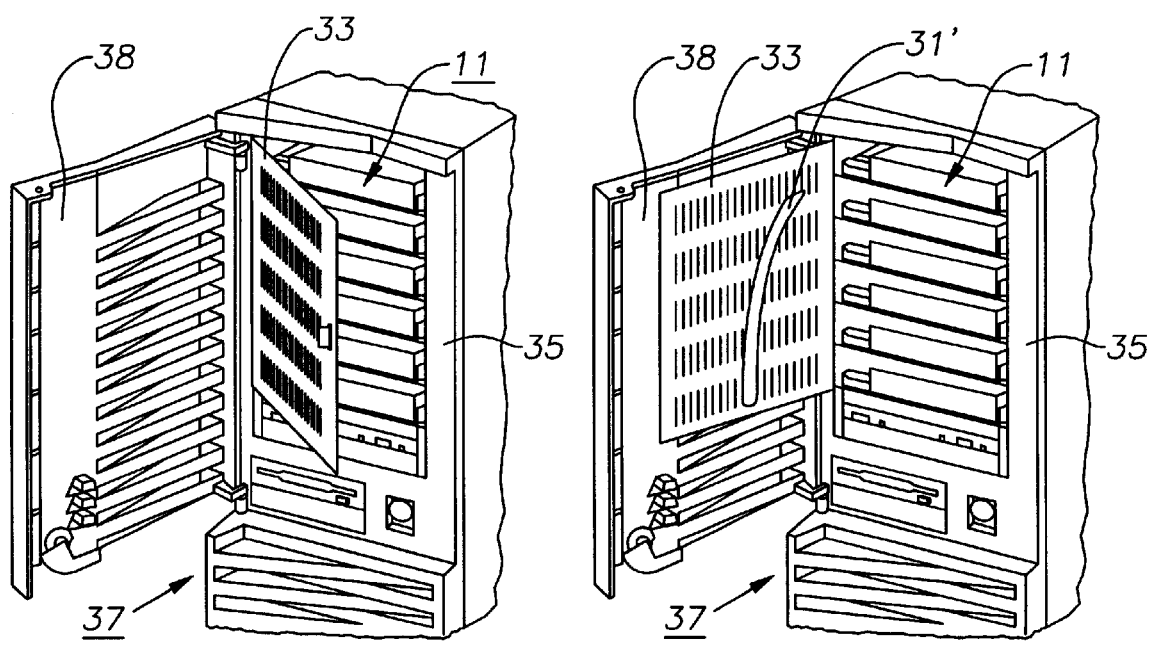

VIBRATION DAMPENING SYSTEM FOR REMOVABLE HARD DISK DRIVE CARRIERS

TECHNICAL FIELD

This invention relates in general to removable hard disk drives and in particular to a vibration dampening system for removable hard disk drive carriers.

BACKGROUND ART

"Hot-pluggable" hard disk drives (HDD) are removable during operation in a computer or peripheral systems environment. An HDD is typically mounted in a hard disk drive carrier prior to installation in a system. An HDD carrier is a frame-like structure which attaches to the HDD to assist in its insertion into or removal from the system. HDD carriers also protect the HDD when it is outside of the systems environment. HDD carriers are typically constructed out of metal and/or polymeric materials.

The system usually contains several HDD's, each of which may be readily interchangeable in the system. The HDD's are mounted in an HDD bay or chassis located within a system enclosure. During operation, the HDD's create vibration as they rotate. The vibration can become excessive, particularly when adjacent HDD's are operated simultaneously. Moreover, as HDD technology progresses to faster rotational speeds and cost-reduction architectures, the vibration problems are exacerbated.

Excessive vibration may lead to decreased HDD performance such as recoverable and non-recoverable write inhibits, increased seek times, and increased read and write access times. Excessive vibration may also cause premature HDD failures that are not repairable. Examples include mechanically-damaged platters and read/write heads, mechanical wear on moving HDD components, and data error defects that cannot be corrected through the use of software tools. Thus, a need exists to reduce systems vibration caused by removable HDD's.

DISCLOSURE OF THE INVENTION

A "hot-pluggable" hard disk drive is mounted in a removable hard disk drive tray. The hard disk drive tray has a vibration dampening system for reducing vibration between the hard disk drive, the hard disk drive tray, and a hard disk drive docking bay located within a computer system. The vibration dampening system has three primary components. The first component is a strip of polymeric material located between an end of the hard disk drive tray and the docking bay. The second component of the vibration dampening system is a set of polymeric strips located between an inner surface of the tray and the hard disk drive. The third component of the vibration dampening system is a set of spring assemblies. Each spring assembly is located between the sides of the tray and the docking bay.

BRIEF DESCRIPTION OF THE DRAWINGS

FIG. 1 is an exploded isometric view of a hard disc drive carrier constructed in accordance with the invention.

FIG. 2 is an isometric view of the hard disk drive carrier of FIG. 1.

FIG. 3 is an enlarged sectional side view of a side wall and damper of the hard disk drive carrier of FIG. 1 taken along the line 3—3 of FIG. 2.

FIG. 5 is an isometric view of the hard disk drive carrier of FIG. 4.

FIG. 6 is an isometric view of a hard disk drive bay loaded with a plurality of the hard disk drive carriers of FIGS. 1 or 4 with the bay door partially opened.

FIG. 7 is an isometric view of the hard disk drive bay of FIG. 6 with the bay door completely opened.

BEST MODE FOR CARRYING OUT THE INVENTION

Figure 4:
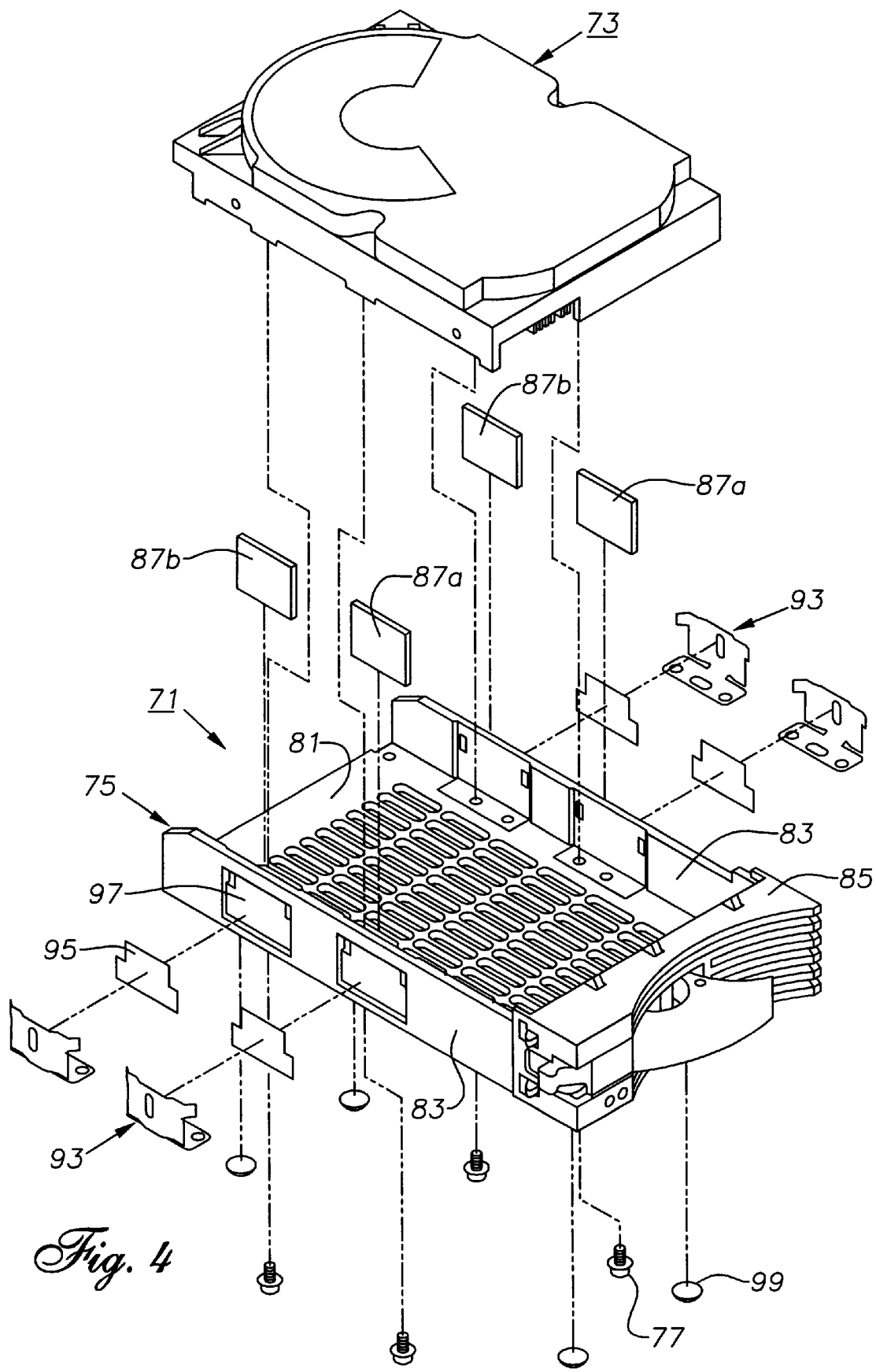
FIG. 4 is an exploded isometric view of an alternate embodiment of the hard disk drive carrier of FIG. 1.

Referring to FIGS. 1 and 2, a hard disk drive assembly 11 having a removable or "hot-pluggable" hard disk drive 13 and a first of a removable hard disk drive carrier 15 is shown. Hard disk drive 13 has an electrical connector (not shown) on a forward end 17 for connecting to a systems environment connector (not shown). Carrier 15 comprises a generally rectangular frame-like structure or tray having a planar base 21, a pair of side walls 23 extending perpendicularly upward from base 21, and a rear end 25 with a handle 29. Carrier 15 has an open forward end which allows the connector on hard disk drive 13 to engage the systems environment connector. Hard disk drive 13 is rigidly mounted to carrier 15 with four screws 27 or ether suitable fasteners.

Carrier 15 also comprises a vibration dampening system having three primary components. The first component is an external end absorber 31 which is bonded or mounted to the rearward end 25 of each carrier. End absorbers 31 may be formed from short strips of polymeric material or a combination of polymeric materials with vibration and shock absorption properties. End absorbers 31 are designed to absorb vibration between individual hard disk drive assemblies 11 and the closure of the docking bay in the system environment. An alternative configuration and location for end absorbers 31 is shown in FIGS. 6 and 7. End absorber 31' is longer than end absorber 31 but is formed from the same material. End absorber 31' may be attached or bond ed directly to the door 33 of the docking bay 35 in system 37 to collectively insulate vibration of hard disk drives assemblies 11 from one another and door 33 of system 37.

A second component of the vibration dampening system comprises a plurality of internal side absorbers 41. Side absorbers 41 are short, vibration-absorbing strips and may be formed from the same material as end absorbers 31. In the embodiment of FIGS. 1 and 2, each carrier 15 has three side absorbers 41a, 41b, 41c bonded or mounted to an inner surface of each side wall 23. The side absorbers 41 are cut to various lengths to better accommodate hard disk drive 13. When hard disk drive 11 is assembled, the dampening material is deflected to create an interference fit between hard disk drive 13 and carrier 15. The interference fit is created by encroaching on the hard disk drive form factor.

The third component of the vibration dampening system comprises a pair of spring assemblies 51. One spring assembly 51 is located on each side wall 23 of carrier 15. Each spring assembly 51 has a thin rectangular pad 53 and a spring 55. Pads 53 are formed from dampening material which is similar to the dampening materials described above. Springs 55 may comprise metal or conductive polymer materials. In either case, springs 55 may also act as an EMC and ESD ground interface between hard disk drive 13, carrier 15 and the docking bay of the system.

Each spring 55 has an absorption portion 57 and a mounting portion 59. As shown in FIGS. 1 and 3, pad 53 is sandwiched between each absorption portion 57 of spring 55 and a recess 61 on the outer surface of side wall 23. A small tab 58 on each end of absorption portion 57 snaps into slots in recess 61 to retain spring 55 and pad 53 in place. Each spring assembly 51 is located on the opposite side of side wall 23 as the middle side absorber 41b. Mounting portion 59 locates adjacent to base 21 of carrier 15 and is secured with a screw 27 to the lower side of base 21. If necessary, mounting portions 59 act as ESD contact points. When properly installed, a small space or gap 63 will be defined between a central portion of absorption portion 57 which protrudes a small distance away from side wall 23 and pad 53. Gap 63 allows the central portion of absorption portion 57 to deflect slightly relative to pad 53. Spring assemblies 51 are designed to act as a bridge or part of a bridge for physical contact between hard disk drive 13 or carrier 15 and the docking bay for the system. Spring 55 and pads 53 either contact each other directly or they support common reaction force components within the assembly.

In operation, a plurality of hard disk drive assemblies 11 are assembled by fastening a hard disk drive 13 to each carrier 15 (FIG. 2). Side absorbers 41 eliminate mechanical lash and absorb vibration between hard disk drive 13 and carrier 15. With bay door 33 in the open position (FIG. 7), each assembly 11 is inserted into a slot in docking bay 35. Spring assemblies 51 contact the guide rails (not shown) in docking bay 35, thereby slightly depressing absorption portions 57 for additional vibration dampening. With assemblies 11 fully installed, bay door 33 and the system enclosure door 38 are closed. End absorbers 31 (FIG. 2) or end absorber 31' (FIG. 7) further dampen vibration between the assemblies 11 and docking bay 35.

Referring to FIGS. 4 and 5, a hard disk drive assembly 71 having a removable hard disk drive 73 and a second embodiment of a removable hard disk drive carrier 75 is shown. Carrier 75 is similar to but slightly larger than carrier 15 and has a base 81, a pair of side walls 83 extending upward from base 81, and a disk actuator 85 on a rearward end. Hard disk drive 73 is rigidly mounted to carrier 75 with four screws 77 or other suitable fasteners.

Carrier 75 has a vibration dampening system with three primary components. The first component is a set of internal side absorbers 87. Side absorbers 87 are similar to side absorbers 41, described above and formed from the same material. Each carrier 75 has two side absorbers 87a, 87b which are mounted to an inner surface of each side wall 83. The dampening material of side absorbers 87 absorbs vibration between hard disk drive 73 and carrier 75.

The dampening system of carrier 75 also comprises four spring assemblies 91, two of which are on each side wall 73 of carrier 75. Spring assemblies 91 are identical to spring assemblies 51 and have a spring 93 and pad 95. Each spring assembly 91 mounts in a recess 97 on an outer surface of side wall 75 in the same manner as described above. Spring assemblies 91 dampen vibration between hard disk drive assembly 11 and the system docking bay.

The third component of the dampening system is a set of four dimple-like button pads 99. Each button pad 99 is mounted near a corner on the outer side of base 81 to provide additional vibration absorption between hard drive assembly 11 and the system docking bay.

In operation, a plurality of hard disk drive assemblies 71 are assembled and installed in a system docking bay (similar to those depicted in FIGS. 6 and 7). Side absorbers 87 eliminate mechanical lash and absorb vibration between hard disk drive 73 and carrier 75. The spring assemblies 91 contact the guide rails in the docking bay for additional vibration dampening. Button pads 99 (FIG. 4) further dampen vibration between the assemblies 71 and the system docking bay.

The invention has several advantages. The vibration and dampening system reduces or eliminates excessive vibration created by removable hard disk drives. The dampening system is located at interfaces between the hard disk drive, carrier and docking bay, and does not alter the for factor of the HDD. The dampening system can offer EMC and ESD grounding of the HDD and the carrier. In addition, the dampening system may be fastened to the carrier or directly to the HDD.

While the invention has been shown or described in only some of its forms, it should be apparent to those skilled in the art that it is not so limited, but is susceptible to various changes without departing from the cope of the invention. For example, the dampening materials may be formed from a thin film, sheet, molded or a combination thereof, and may be placed at a variety of interfaces to further reduce vibration and shock.

What is claimed is:

1. A hard disk drive carrier for dampening the vibration of a computer hard disk drive, the computer having an enclosure, a docking bay located within the enclosure, and a slot within the docking bay for receiving the hard disk drive carrier, comprising:

a tray having a base, a pair of side walls extending perpendicularly from the base, and a rearward end, wherein the tray rigidly mounts the hard disk drive to the base between the side walls;

a first dampening element mounted between the hard disk drive and each of the side walls of the tray for reducing vibration therebetween;

a second dampening element mounted between the docking bay slot and each of the side walls of the tray for reducing vibration therebetween; and a third dampening element mounted between the docking bay and a portion of the tray other than the side walls of the tray for reducing vibration therebetween.

2. The hard disk drive carrier of claim 1 wherein the first dampening elements comprise strips of polymeric material mounted to an inner surface of each of the side walls.

3. The hard disk drive carrier of claim 1 wherein the second dampening elements comprise spring assemblies mounted to an exterior surface of each of the side walls.

4. The hard disk drive carrier of claim 3 wherein each of the spring assemblies comprises a spring and a polymeric dampening pad which is sandwiched between the spring and the side wall of the tray.

5. The hard disk drive carrier of claim 4 wherein the spring is mounted in a recess in the side wall of the tray.

6. The hard disk drive carrier of claim 1 wherein the third dampening element comprises a strip of polymeric material mounted to an outer surface of the rearward end for absorbing vibration between the rearward end of the tray and the door of the docking bay.

7. The hard disk drive carrier of claim 1 wherein the third dampening element comprises a strip of polymeric material which is adapted to be mounted to an inner surface of the door of the docking bay for absorbing vibration between the door of the docking bay and the rearward edge of the tray.

8. The hard disk drive carrier of claim 1 wherein the third dampening element comprises a button pad mounted near each corner of an outer surface of the base of the tray for absorbing vibration between the base and the slot of the docking bay.

9. A computer, comprising:

at least one hard disk drive carrier having a base, a pair of side walls extending perpendicularly from the base, and a rearward end;

a hard disk drive mounted to the base of said at least one hard disk drive carrier between the side walls;

a system enclosure;

a hard disk drive docking bay located within the enclosure and having a movable docking bay door and a plurality of slots wherein one of the slots receives said at least one hard disk drive carrier;

a first dampening element comprising a strip of polymeric material mounted between an inner surface of each of the side walls of said at least one hard disk drive carrier and the hard disk drive for reducing vibration therebetween;

a second dampening element comprising a spring assembly mounted between an exterior surface of each of the side walls of said at least one hard disk drive carrier and said one of the slots of the hard disk drive docking bay for reducing vibration therebetween; and a third dampening element mounted between the docking bay and a portion of said at least one hard disk drive carrier other than the side walls for reducing vibration therebetween.

10. The computer of claim 9 wherein each of the spring assemblies comprises a spring and a dampening pad which is sandwiched between the spring and the side wall of said at least one hard disk drive carrier.

11. The computer of claim 10 wherein the spring is mounted in a recess in the side wall of said at least one hard disk drive carrier.

12. The computer of claim 9 wherein the third dampening element comprises a strip of polymeric material mounted to an outer surface of the rearward end of each of the carriers for absorbing vibration between the rearward end of said at least one hard disk drive and the docking bay door.

13. The computer of claim 9 wherein the third dampening element comprises a strip of polymeric material mounted to an inner surface of the docking bay door for absorbing vibration between the docking bay door and the rearward end of said at least one hard disk drive carrier.

14. The computer of claim 9 wherein the third dampening element comprises four button pads, each mounted near a corner of an outer surface of the base of said at least one hard disk drive carrier for absorbing vibration between the base and the docking bay.

15. A computer, comprising:

a plurality of hard disk drive carriers, each having a base, a pair of side walls extending perpendicularly from the base, and a rearward end;

a hard disk drive mounted to the base of each of the hard disk drive carriers between the side walls;

a system enclosure;

a hard disk drive docking bay located within the enclosure and having a movable docking bay door and a plurality of slots, each of the slots receiving one of the hard disk drive carriers; and wherein each of the hard disk drive carriers has:

a set of first dampening elements mounted between each of the hard disk drives and each of the side walls of each of the carriers for reducing vibration therebetween;

a set of second dampening elements mounted between each of the docking bay slots and each of the side walls of each of the carriers for reducing vibration therebetween; and a third dampening element mounted between the docking bay and a portion of each of the carriers other than the side walls of the carriers for reducing vibration therebetween.

16. The computer of claim 15 wherein each of the first dampening elements comprises a strip of polymeric material mounted to an inner surface of each of the side walls; and wherein each of the second dampening elements comprises a spring assembly mounted to an exterior surface of each of the side walls.

17. The computer of claim 15 wherein each of the spring assemblies comprises a spring and a dampening pad which is sandwiched between the spring and the side wall of each of the carriers, and wherein the spring is mounted in a recess in the side wall of the tray.

18. The computer of claim 15 wherein the third dampening element comprises a strip of polymeric material mounted to an outer surface of the rearward edge for absorbing vibration between the rearward end of each of the carriers and the docking bay door.

19. The computer of claim 15 wherein the third dampening element comprises a strip of polymeric material mounted to an inner surface of the docking bay door for absorbing vibration between the docking bay door and the rearward end of each of the carriers.

20. The computer of claim 15 wherein the third dampening element comprises four button pads, each mounted near a corner of an outer surface of the base of each of the carriers for absorbing vibration between the base and the docking bay.

21. The hard disk drive carrier of claim 1, further comprising a hard disk drive mounted to the tray.

* * * * *